L. W. BUGBEE & G. H. DAY.
LENS CENTERING AND MARKING MACHINE.
APPLICATION FILED JUNE 7, 1915.
1,281,506.
Patented Oct. 15, 1918.
3 SHEETS—SHEET 3.
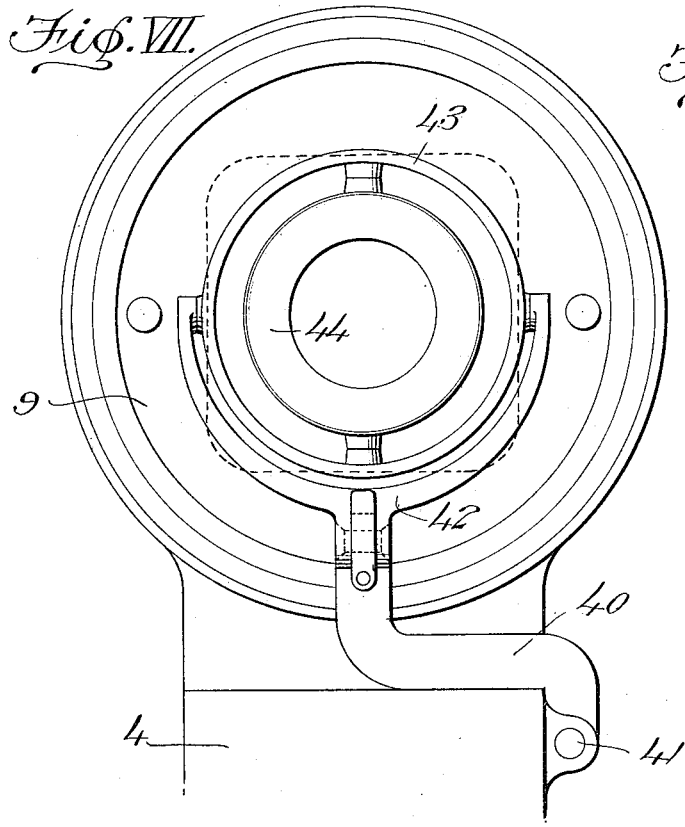
Fig. VII.
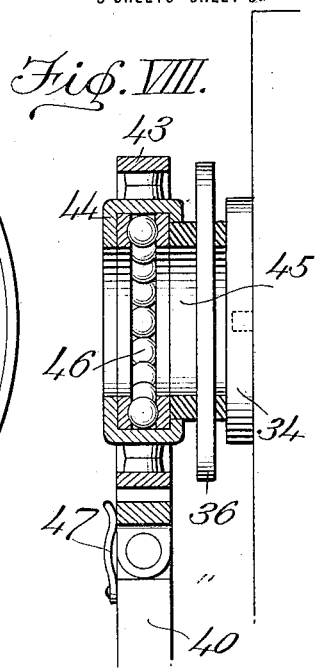
Fig. VIII.
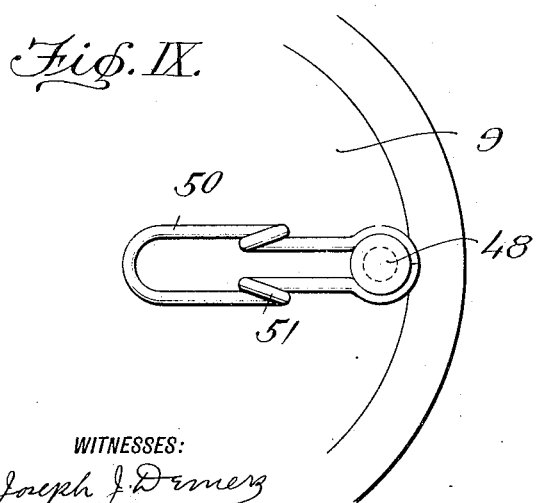
Fig. IX.
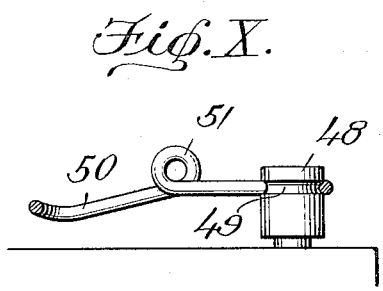
Fig. X.
WITNESSES:
Joseph J. Demers
Samuel Bailey
INVENTOR
George H. Day,
Lucian W. Bugbee,
BY
H. H. Styll & H. K. Parsons.
ATTORNEY

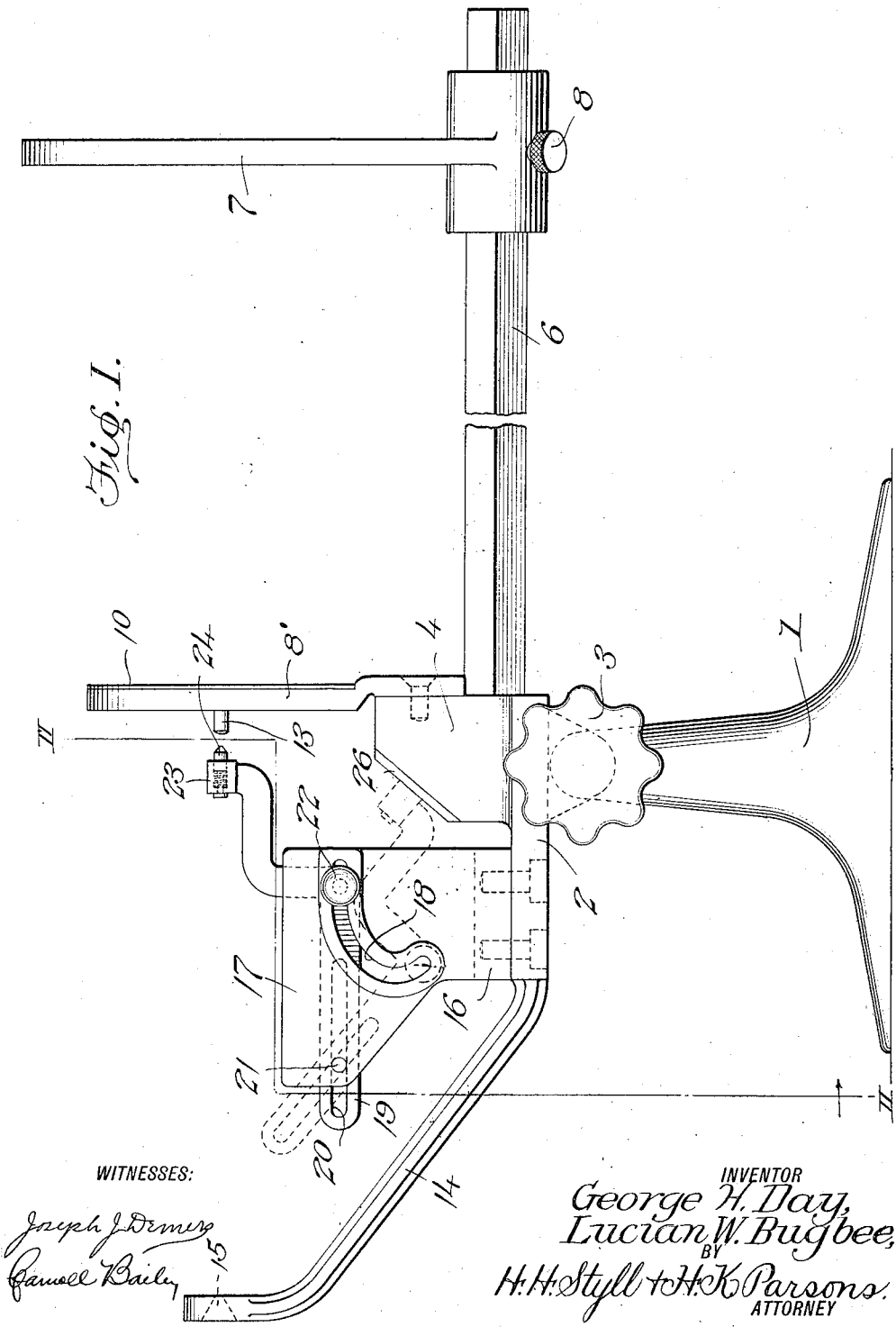

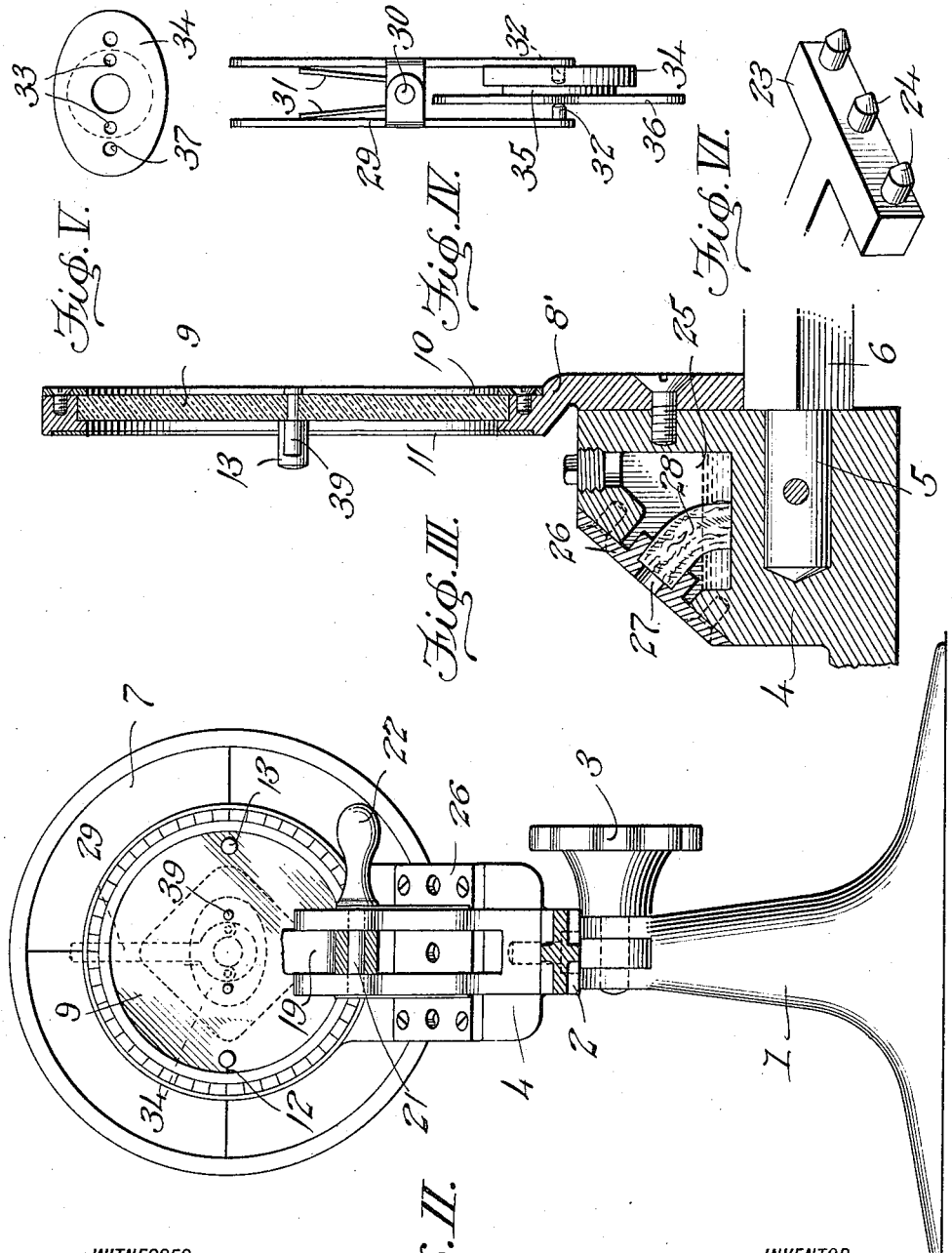

UNITED STATES PATENT OFFICE.

LUCIAN W. BUGBEE AND GEORGE H. DAY, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS.

LENS CENTERING AND MARKING MACHINE.

1,281,506. Specification of Letters Patent. Patented Oct. 15, 1918.

Application filed June 7, 1915. Serial No. 32,607.

*To all whom it may concern:*

Be it known that we, LUCIAN W. BUGBEE and GEORGE H. DAY, citizens of the United States, residing at Southbridge, in the county of Worcester and State of Massachusetts, have invented certain new and useful Improvements in Lens Centering and Marking Machines, of which the following is a specification.

This invention relates to lens centering and marking machines, and has for its principal object to generally improve the construction and increase the efficiency of operation of machines of this character.

Another leading object is to provide means whereby the lens may be arranged for rotative movement relative to a former plate whereby its optical axis may be determined, and to provide means whereby the former plate may be rotated to any desired degree so that the lens and former may be easily and quickly placed in a machine with its optical and geometrical axes in an offset desired relative degree for edging.

A further object of the invention is to provide novel and efficient means for detachably securing a lens in position to be marked whereby a minimum of time and labor is required to arrange another lens in position upon completion of the operation upon the previous lens.

A still further object is to provide an extremely simple marking device for a machine of this character which will be efficient for its purpose and one in which longevity and liability of breakage are thoroughly accounted for.

With the foregoing and other objects in view the invention consists in the novel features of construction, combination and arrangements of parts, as will be hereinafter more fully described, illustrated in the accompanying drawings, and claimed.

In the drawings:

Figue I is a side elevation of the complete machine.

Fig. II is a vertical sectional view on the line II—II of Fig. I.

Fig. III is a vertical sectional view through the transparent plate and the supporting means therefor.

Fig. IV is a side elevation of the lens holding tool used in connection with the transparent plate.

Fig. V is a rear face view of the former disk.

Fig. VI is a detail perspective view showing the arrangement of the marking point.

Fig. VII is a face view of the transparent plate, the frame therefor and of a slightly modified form of lens holding means.

Fig. VIII is a central vertical section through the structure illustrated in Fig. VII.

Fig. IX is a face view of the plate and frame therefor illustrating a further slightly modified form of lens holding means attached thereto.

Fig. X is a longitudinal sectional view through the structure illustrated in Fig. IX.

Referring to the drawings by numerals 1 designates the base of the machine including an upright portion on the upper terminal end of which is pivotally mounted for vertical tilting movement, the frame 2, a hand wheel 3 being provided whereby the frame may be locked in any desired tilted position to adapt the machine for convenient use of the operator.

A block 4 is carried upon the upper face of the frame 2 at the forward end thereof, and rigidly secured within an opening in this block is the reduced end 5 of the rectangularly shaped bar 6, the said bar being extended forwardly from the front of the block 4 and having slidably mounted thereon for adjustment toward or away from the block the target 7 which may be locked in any adjusted position by means of the thumb screw 8. This target is of the ordinary vertical and horizontal cross line type, and is preferably arranged in fixed position with respect to the other parts of the machine, or in other words, is non-rotatable.

Secured in any suitable or preferred manner to the front face of the block 4 is the circular frame 8' in which is rotatably mounted in any suitable manner, the transparent plate 9, the plate in the present instance having the peripheral edge thereof seated in a channel in the frame and a ring 10 being secured to the plate and having a portion thereof overlapping the edge of the plate in order to permit of its rotation within the frame and prevent its disengagement therefrom.

A circular scale 11 graduated in the degrees of a circle is secured in any suitable manner to the face of the frame 8' and this scale is adapted to coöperate with the pointer marks 12 on the plate 9, whereby when the plate is rotated the operator may ascertain at a glance the exact degree of such rotation, knobs 13 being secured to the plate in order to facilitate operation thereof.

An arm 14 extends upwardly at an angle from the frame 2 and terminates in the vertically extending portion which is provided with a sight opening 15 arranged in alinement with the centers of the plate 9 and the target 7.

Carried in any suitable manner upon the upper face of the frame 2 is a bracket 16 comprising the spaced side walls 17 in which are formed the arcuately shaped slots 18. A marking arm 19 is arranged between the side walls of the bracket and is provided with a longitudinal slot 20 which rides upon a pin 21 extending through the side walls of the bracket whereby the member 19 is slidably and pivotally mounted. A handle 22 is carried by the member 19 and has a reduced portion thereof arranged in the slot 18 for sliding movement. The member 19 is bent upwardly adjacent the handle 22 and terminates in a forwardly horizontally extending portion provided with a T-head 23. A plurality of marking pins 24, preferably three in number, are yieldably mounted in the head 23 and are so positioned as to aline with the center of the plate 9 when in their operative position, as illustrated in full lines in Fig. I of the drawings.

The rear face of the block 4 is provided with an angular face having an opening formed therein communicating with a well 25, and secured to this angular face is a plate 26 provided with openings 27 in which the points 24 are adapted to engage when the marking device is in its lowered position, as illustrated in dotted lines in Fig. I of the drawings, whereby the points will engage with the wicks 28 which have their lower ends arranged in the inking liquid and through capillary action will supply ink to the marking points, the slots 18 being so curved and arranged with respect to the pin 21 as to cause the points 24 to alternately engage in the openings 27 and in alinement with the center of the plate 9 as the handle 22 is reciprocated in the slots 18.

In the use of the machine we preferably make use of a tool such as is illustrated in Fig. IV of the drawings. This tool comprises a pair of arms 29 each of which is similar in construction, and are pivoted together in spaced relation, as at 30, a spring 31 being arranged between the finger operating end of the parts 29 whereby their opposite ends will be forced together, as will be understood.

A pair of pins 32 are carried on the inner face of each of the parts 29 and either pair of these pins are adapted to be engaged in recesses 33 in the rear face of a former plate 34, as is clearly illustrated in Fig. IV of the drawings. The front face of this plate is provided with a pad 35 against which is adapted to be placed the lens blank 36 to be centered and marked, the pair of pins 32 not in engagement with the recesses 33 being adapted to engage the front face of the blank 36 in order to hold the same in fixed position relative to the former 34. A second pair of recesses 37 is formed in the rear face of the former 34 and when the former, lens and tool are arranged as illustrated in Fig. IV of the drawings the assembled parts are adapted to be placed upon the machine with the recesses 37 arranged upon a pair of pins 39 carried by the transparent plate 9 whereby the lens will be in a position for centering and marking.

With the pad in the position as just set forth and with the marking device in lowered position, as illustrated in dotted lines in Fig. I of the drawing, the operator's eye is applied to the opening 15 and the lens 36 grasped by the fingers of one hand and maneuvered until its optical axes are in alinement with the cross lines of the target 7. If the optical center of the lens alone is desired the handle 22 is then grasped and the marking device moved to its forward position, as illustrated in full lines in Fig. I of the drawing, whereby the point 24 will mark the true optical axis of the lens upon the blank. Assuming, however, that it is desired to obtain a finished lens whose geometrical axes will be any predetermined number of degrees off of its optical axes, it is only necessary to grasp one of the knobs 13 and rotate the transparent plate 9 which will carry the pad 35, which has its principal meridian in alinement with the lines 12 until the lines 12 aline with the desired degree mark upon the scale 11. The lens is then rotated in the ordinary manner relative to the pad until it is correctly optically centered, whereupon it is removed from the machine and placed into a suitable edging device whereby the finished lens will have its optical axes arranged the desired degree relative to its geometrical axis, it being understood that the spring 31 is of sufficient strength to cause the pins 32 to hold the lens 36 in firm engagement with the pad 35 whereby the same will be rotated with the plate 9 but which is not held in too firm an engagement therewith, as will prevent its being moved by the fingers of the operator with respect to the pad.

It is thought from the foregoing description taken in connection with the accompanying drawings that the construction and operation of the preferred embodiment of our invention will be clearly understood, and therefore a further detailed description is thought to be unnecessary.

In Figs. VII and VIII of the drawings we have shown means to take the place of the tool illustrated in Fig. IV of the drawings for holding the lens in engagement with the transparent plate 9. This embodiment of our invention includes an arm 40 pivoted at 41 to lugs formed on the side of the block 4 and having pivotally mounted on the upper end thereof the bifurcated arm 42 between the terminal ends of which is pivotally mounted the ring 43. A second ring 44 is pivotally mounted within the ring 43 at points at right angles to the point of pivotance of this ring. A pad 45 is mounted for free rotation within the ring 44 by means of the ball bearings 46 and this pad is adapted to engage the outer face of the lens 36 in a manner similar to the point 32 and for the same purpose, the former plate 34 being utilized in this form of our invention in a manner similar to its use as illustrated in Fig. II of the drawings. A flat spring 47 is secured to the arm 40 and exerts a tension against the bifurcated arm 42 whereby the pad 45 will be caused to engage against the lens 36 and hold the same against accidental movement relative to the former 34. By pivoting the rings 43 and 44 as shown it will be seen that the pad 45 will be caused to firmly engage against the lens 36 irrespective of irregularities or the size of the curve formed thereon, and it will be seen that because of the pivotal connection 41 between the arm 40 and the block 4 the entire lens holding means may be swung from its operative position upon the face of the transparent plate. Furthermore, it will be seen that the ball bearing 46 will permit of free rotation of the lens when the transparent plate 9 is rotated and will also permit of movement of the lens during the operation of finding its optical center relative to the former 34.

In Figs. IX and X of the drawings we have shown a very simple device to serve the purposes of the structure illustrated in Figs. IV, VII and VIII of the drawings. The device referred to comprises a spool 48 which is adapted to be engaged with either of the knobs 13 and which is provided with an annular recess 49 within which is seated the circular shaped portion of the wire clamping member 50. The free end of this clamping member extends to a point to overlie the center of the plate 9 and intermediate its ends this member is provided with the loops 51 whereby a spring tension is secured for the outer end of the member for a purpose which will be understood from the previous description of the structures illustrated in Figs. VII and IV of the drawings.

From the foregoing description taken in connection with the accompanying drawings, it is thought that the construction and operation of the machine will be clearly understood, and while we have herein shown and described certain embodiments of our invention we do not wish to be limited thereto except to such limitations as the claims may impart.

We claim:

1. In a lens centering and marking machine, the combination with a support and a target and sighting device carried by the support, of a transparent rotatable lens supporting member intermediate the lens target and sighting device, an arm movable into and out of central alinement with the lens support, a cylindrical lens clamping member carried by the arm, and means for resiliently pressing the cylindrical clamp toward the lens support to clamp a lens therebetween.

2. In a lens centering and marking instrument, the combination with a support and a target and sighting device carried by the support, of a rotatable lens support intermediate the target and lens centering device, an arm pivoted to the main support and adapted to be swung into alinement with the lens support, a cylindrical clamping device, a double gimbal bearing connecting the arm and clamping device to permit of universal adjusting movement of the clamping device, and means for resiliently pressing the arm and clamping device toward the lens support to secure a lens in position as desired.

3. In a lens centering and marking instrument, the combination with a support, of a sighting device and a target carried by the support, a bracket rising from the support intermediate said parts, a lens support rotatably mounted on the bracket and having its center coincident with the line of vision from the sighting device to the center of the target, a laterally movable arm carried by the support and movable in one direction into position adjacent the rotatable lens supporting device, a yoke pivoted to the upper end of the arm, a cylindrical lens clamping device connected to the yoke by a double gimbal bearing, the clamping device being freely rotatable within the bearing, and a spring carried by the arm and pressing against the yoke to swing the clamping device inward toward the lens support whereby a lens may be clamped in position by the clamping device, the double gimbal bearing facilitating automatic adjustment of the clamping device according to the shape of the lens and the rotatable mounting of the clamping device permitting of rotation of the lens, lens support and clamping device as a unit relative to the remainder of the instrument.

4. In an instrument of the character described, the combination with a support and a target and sighting device carried by the support, of a bracket rising from the support intermediate the target and sighting device, a member rotatably mounted in the bracket and provided with a pair of pins, a former plate having a pair of apertures to receive the pins on the rotatable device and having an additional pair of apertures adapted to receive a lens clamp whereby the lens clamp may be affixed to the former to secure a lens thereto and the entire device applied in position in the instrument through engagement of the former and pins on the rotatable device, substantially as and for the purpose described.

5. A lens centering instrument, including a sighting device and a target, a support for the parts, a lens positioning bracket rising intermediate the parts, a lens clamp plate, a rotatable lens supporting device within the bracket, interlocking pin and socket connections between the clamp plate and the rotatable lens supporting device, and a resilient clamp having a portion interlocking with the clamp plate, and a second portion adapted to engage a lens when applied to the clamp plate to secure the lens to the plate and thus through the connection of the plate to the lens supporting device, substantially as and for the purpose described.

6. In a machine of the character described, a rotatable transparent plate, means whereby a former plate may be fixedly mounted upon said plate, means for holding a lens in engagement with said former plate, and means whereby the exact degree of rotation of the transparent plate may be determined, said lens holding means permitting of rotation of the lens relative to the former plate whereby the same may be optically centered.

In testimony whereof we affix our signatures in presence of two witnesses.

LUCIAN W. BUGBEE.
GEORGE H. DAY.

Witnesses:
CARROLL BAILEY,
JOSEPH J. DEMERS.

Copies of this patent may be obtained for five cents each, by addressing the "Commissioner of Patents, Washington, D. C."